US012694684B2

(12) United States Patent
Padmanabhan et al.

(10) Patent No.: US 12,694,684 B2
(45) Date of Patent: Jul. 28, 2026

(54) SYSTEM OF NAVIGATION AND ALERT MECHANISM IN UNFAVORABLE WEATHER CONDITIONS USING A NETWORK OF COLLABORATING DRONES

(71) Applicant: INTERNATIONAL BUSINESS MACHINES CORPORATION, Armonk, NY (US)

(72) Inventors: Girish Padmanabhan, Pune (IN); Dibyendu Chandra, Pune (IN); Suman Karmakar, Pune (IN); Bhuvana Sundarri Adhi Moolam, Coimbatore (IN)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 18/964,241

(22) Filed: Nov. 29, 2024

(65) Prior Publication Data

US 2026/0154967 A1      Jun. 4, 2026

(51) Int. Cl.
| | |
|---|---|
| *G06V 20/56* | (2022.01) |
| *G01C 21/36* | (2006.01) |
| *G06T 5/50* | (2006.01) |
| *G06V 20/17* | (2022.01) |

(52) U.S. Cl.
CPC ......... *G06V 20/56* (2022.01); *G01C 21/3602* (2013.01); *G06T 5/50* (2013.01); *G06V 20/17* (2022.01); *G06T 2207/20221* (2013.01)

(58) Field of Classification Search
CPC .... G06V 20/56; G06V 20/17; G01C 21/3602; G06T 5/50; G06T 2207/20221

USPC ......................................................... 348/148
See application file for complete search history.

(56) References Cited

U.S. PATENT DOCUMENTS

| | | | |
|---|---|---|---|
| 5,657,073 A | 8/1997 | Henley | |
| 10,616,734 B1 | 4/2020 | Lekutai | |
| 2019/0227555 A1* | 7/2019 | Sun | G08G 1/142 |
| 2020/0020231 A1* | 1/2020 | Dhiman | G08G 5/57 |
| 2020/0398985 A1 | 12/2020 | Hsu | |
| 2021/0070471 A1* | 3/2021 | Ahmed | G06V 20/10 |
| 2023/0110027 A1* | 4/2023 | Bajpayee | B60W 30/09 701/301 |

(Continued)

OTHER PUBLICATIONS

Zhang, Saining, et al. "Drone-assisted road gaussian splatting with cross-view uncertainty." arXiv preprint arXiv:2408.15242 (2024). (Year: 2024).*

(Continued)

*Primary Examiner* — Sath V Perungavoor
*Assistant Examiner* — Kristin Dobbs
(74) *Attorney, Agent, or Firm* — CHIP LAW GROUP

(57) ABSTRACT

A computer-implemented method includes using an image captured by a vehicle camera on the vehicle to determine a vehicle visibility distance for the vehicle with a computing device on the vehicle. The determined vehicle visibility distance is compared to a predetermined desired visibility distance and a first drone is used at the vehicle visibility distance away from the vehicle when the vehicle visibility distance is less than the predetermined desired visibility distance. An image captured by the vehicle camera is combined with a first drone video image captured by the first drone to provide a combined image having a total visibility distance of a sum of the vehicle visibility distance and a first drone visibility distance.

20 Claims, 9 Drawing Sheets

(56) References Cited

U.S. PATENT DOCUMENTS

| | | |
|---|---|---|
| 2023/0177968 A1 | 6/2023 | Arksey et al. |
| 2024/0019864 A1 | 1/2024 | Elshenawy |
| 2024/0241520 A1 | 7/2024 | Araujo et al. |

OTHER PUBLICATIONS

"Drone Swarms: Collaborative Possibilities and Challenges for Pilots", ClearSpot.ai, Aug. 7, 2023, 7 pages.

"Pilot through road uncertainties with new Drone assisted Driving", Times of India, Jan. 18, 2018, 17 pages, http:// timesofindia. indiatimes.com/articleshow/62558664.cms?utm_source= contentofinterest&utm_medium=text&utm_campaign=cppst.

Disclosed Anonymously, IP.com No. IPCOM000271966D "Drooling Lights: Drone-Based Coordinated, Intuitive, and Energy-Efficient Group Lighting for Safe Navigation", Mar. 10, 2023, 7 pages.

Khezaz et al. "Perception Enhancement and Improving Driving Context Recognition of an Autonomous Vehicle Using UAVs", Journal of Sensor and Actuator Networks, Sep. 20, 2022, 31 pages.

Pandey et al. "A fast and effective vision enhancement method for single foggy image", Engineering Science and Technology, an International Journal, Dec. 2021, pp. 1478-1489, vol. 24, Issue 6.

Saboor et al. "Elevating the Future of Mobility: UAV-enabled Intelligent Transportation Systems", arXiv:2110.09934v2 [cs.NI], Nov. 22, 2024, 7 pages.

Saputro et al. "Drone-Assisted Multi-Purpose Roadside Units for Intelligent Transportation Systems", IEEE, 2018, 5 pages.

* cited by examiner

Merging of images captured from vehicle/ drone in different lanes

Previously recorded image by Car L

Final Merged view seen in Car R

800

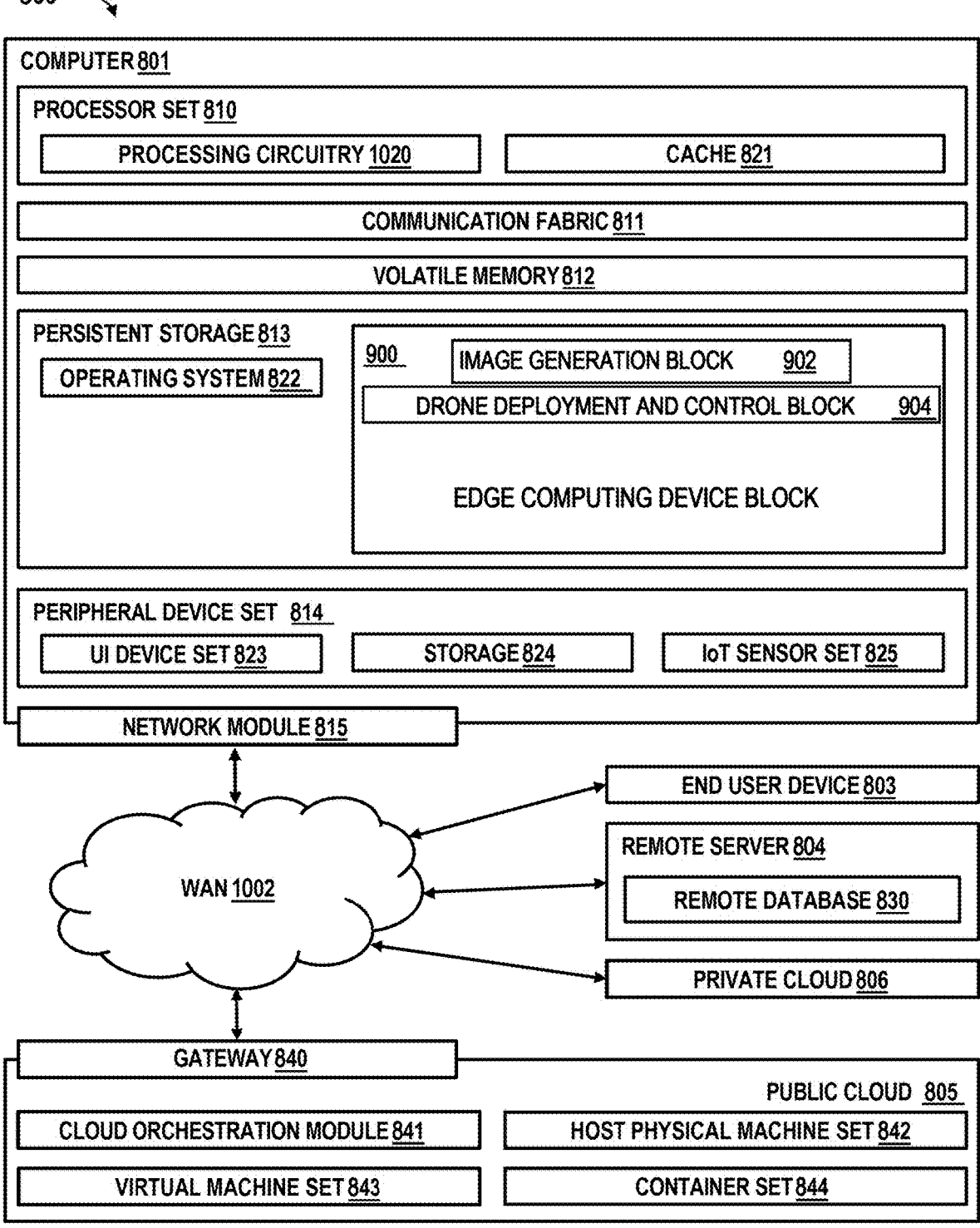

COMPUTER 801

PROCESSOR SET 810

PROCESSING CIRCUITRY 1020 | CACHE 821

COMMUNICATION FABRIC 811

VOLATILE MEMORY 812

PERSISTENT STORAGE 813

OPERATING SYSTEM 822

900 | IMAGE GENERATION BLOCK 902

DRONE DEPLOYMENT AND CONTROL BLOCK 904

EDGE COMPUTING DEVICE BLOCK

PERIPHERAL DEVICE SET 814

UI DEVICE SET 823 | STORAGE 824 | IoT SENSOR SET 825

NETWORK MODULE 815

WAN 1002

END USER DEVICE 803

REMOTE SERVER 804

REMOTE DATABASE 830

PRIVATE CLOUD 806

GATEWAY 840

PUBLIC CLOUD 805

CLOUD ORCHESTRATION MODULE 841 | HOST PHYSICAL MACHINE SET 842

VIRTUAL MACHINE SET 843 | CONTAINER SET 844

FIG. 9

SYSTEM OF NAVIGATION AND ALERT MECHANISM IN UNFAVORABLE WEATHER CONDITIONS USING A NETWORK OF COLLABORATING DRONES

BACKGROUND

The present disclosure generally relates to systems and methods for navigation of a vehicle (manual and autonomous) during low visibility due to bad weather and also a novel alert mechanism informing the vehicle about obstructions in the route, where the systems and methods can use a network of collaborating drones.

The accepted definition of fog is when visibility is below 1,000 meters (m), which is primarily used for aviation purposes. However, for the general public and drivers, it is more practical to consider a maximum visibility limit of 200 m. When visibility drops below 50 m, it leads to significant disruption in road transportation and may cause accidents.

Driving in foggy conditions poses several risks and hazards. Some of the key risks associated with driving in foggy road conditions are as follows: (1) Reduced visibility: Fog significantly reduces visibility, making it difficult to see the road ahead, other vehicles, pedestrians, and potential hazards. This increases the risk of collisions. (2) Increased stopping distance: In fog, it takes longer to perceive and react to obstacles or hazards on the road. The reduced visibility also affects the ability to judge distances accurately, leading to an increased stopping distance. This can result in rear-end collisions if vehicles do not maintain enough space between them. (3) Limited perception of speed: Fog can distort one's perception of speed, leading to either driving too fast or too slow. Both scenarios can be dangerous. Driving too fast can make it difficult to stop in time to avoid a collision, while driving too slow may cause traffic congestion and increase the likelihood of being rear-ended. (4) Disorientation and confusion: Fog can disorient drivers, making it challenging to maintain a sense of direction or recognize familiar landmarks. This can lead to confusion and potential wrong maneuver. (5) Increased risk of multi-vehicle collisions: Due to reduced visibility, multiple vehicles traveling in close proximity may have difficulty seeing each other, resulting in chain-reaction accidents or pileups. (6) In case of autonomous cars, the decision is all based on data available and if the route is not very clear due to fog or bad weather, the data captured would not be accurate and the automated system would not have enough and clear information to take any decision.

SUMMARY

In one embodiment, a computer implemented method and a computer program product can be configured for assisting in navigating a vehicle includes using an image captured by a vehicle camera on the vehicle to determine a vehicle visibility distance for the vehicle with an edge computing device on the vehicle. The determined vehicle visibility distance is compared to a predetermined desired visibility distance and a first drone is deployed at the vehicle visibility distance away from the vehicle when the vehicle visibility distance is less than the predetermined desired visibility distance. An image captured by the vehicle camera is combined with a first drone video image captured by the first drone to provide a combined image having a total visibility distance of a sum of the vehicle visibility distance and a first drone visibility distance.

In another embodiments, the computer-implemented method further includes deploying an additional drone at the total visibility distance when the total visibility distance is less than the predetermined desired visibility distance and combining the image captured by the vehicle camera, the first drone video image, and an additional drone video image captured by the additional drone to provide a further combined image having a further total visibility distance of a sum of the vehicle visibility distance, the first drone visibility distance, and an additional drone visibility distance.

In another embodiment, the computer-implemented method further includes repeating each act of deploying an additional drone and combining the images, stepwise with one additional drone at a time, until the further total visibility distance is greater than the predetermined desired visibility distance.

In another embodiment, a number of deployed drones is based on a determined weather condition.

In another embodiments, the computer-implemented method further includes using one or more drones from a first vehicle and one or more drones from a second vehicle to create the combined image that is shared to both the first vehicle and the second vehicle.

In another embodiment, the vehicle shares the combined image with another vehicle that is not equipped with the one or more drones.

In another embodiment, the computer-implemented method further includes providing communication between each drone of the first drone and each additional drone, wherein the communication tracks a navigation obstacle and provides an alert to the vehicle.

In another embodiment, the computer-implemented method further includes deploying an additional drone at a location past a curve in a road along a direction of travel of the vehicle and displaying the combined image along with an additional image from the additional image, the additional image showing a vehicle travel path of the vehicle past the curve, beyond a visibility range of the vehicle camera.

In another embodiment, the computer-implemented method further includes generating a risk index of a possible mishap based on the first drone video image and instructing the vehicle to perform at least one of a speed change, a position change, or a lighting change.

In another embodiments, the computer-implemented method further includes providing communication between a first vehicle and a second vehicle and using at least one drone from each of the first vehicle and the second vehicle to create a common navigation for both the first vehicle and the second vehicle.

In another embodiment, a system includes a processor; a data bus coupled to the processor; a memory coupled to the data bus; and a computer-usable medium embodying a computer program code, the computer program code comprising instructions executable by the processor. The computer program code is configured to use an image captured by a vehicle camera on the vehicle to determine a vehicle visibility distance for the vehicle with an edge computing device on the vehicle. The determined vehicle visibility distance is compared to a predetermined desired visibility distance and a first drone is deployed at the vehicle visibility distance away from the vehicle when the vehicle visibility distance is less than the predetermined desired visibility distance. An image captured by the vehicle camera is combined with a first drone video image captured by the first drone to provide a combined image having a total visibility distance of a sum of the vehicle visibility distance and a first drone visibility distance.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 9 shows a functional block diagram illustration of a computer hardware platform that can be used to implement the method for assisting in the navigation of a vehicle, consistent with an illustrative embodiment.

DETAILED DESCRIPTION

Figure 1:
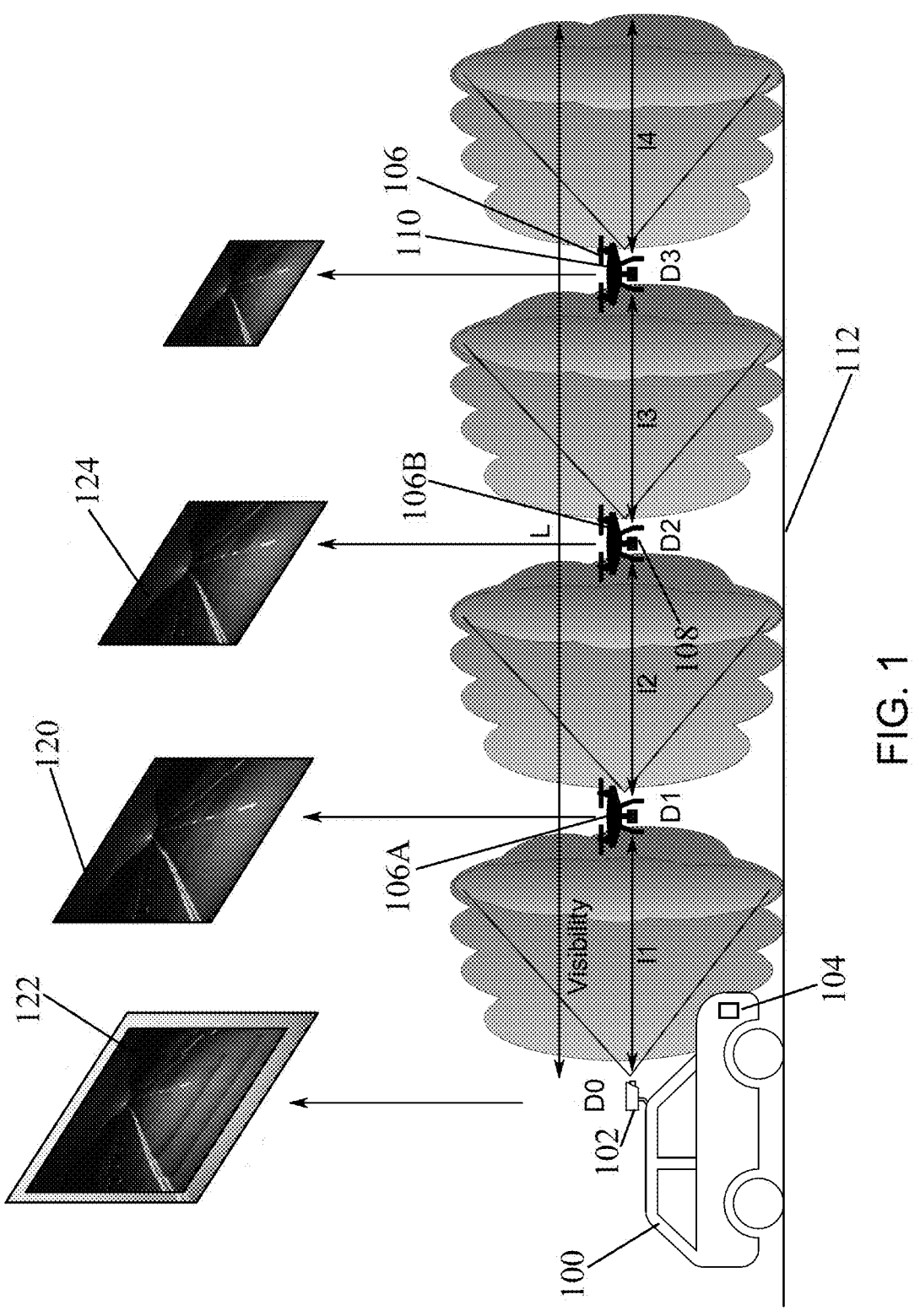
FIG. 1 shows a pictorial representation of how a network of collaborating drones are used to assist with navigation during a low visibility condition, consistent with an illustrative embodiments.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

As described in greater detail below, aspects of the present disclosure provide systems and methods that can provide for enhanced navigation of a vehicle (manual and autonomous) during low visibility due to bad weather. Further, aspects of the present disclosure provide a novel alert mechanism informing the vehicle about obstructions in the route, where the systems and methods described herein can use a network of collaborating drones.

Aspects of the present disclosure provide a network of collaborating drones to assist with navigation during low visibility due to bad weather conditions, by capturing different sections of the route and creating a combined enhanced and realistic visualization of route up to a preferred or predetermined visibility distance. A computing system can be used for processing the images from all the drones and for creating a merged image at the edge node in the vehicle to provide the vehicle and/or a user of the vehicle an enhanced and realistic driving experience.

In some embodiments, a system of advanced alert mechanisms can be provided by the collaborating drones based on the position of drone, from vehicle, where the drones can indicate a risk index of a possible mishap and passing instructions to the vehicle in terms of speed, position on the road, flashing headlamps, and the like.

In some embodiments, the system can provide for the dynamic selection of a number of drones to be used, as well as the deployment and placement of drones based on (a) weather condition to provide clarity in the enhanced view from the vehicle for e.g., for low visibility, two drones can be sued to capture the route for a distance of 100 meters from vehicle, but in extreme low visibility, four drones could be required for mapping the same 100 meters. In some embodiments, the number of drones is also determined by a predetermined visibility distance for the vehicle under the determined weather conditions Also, if the enhanced view in the vehicle detects that the navigation view at a distance of 35 meters is not very clear, then the drones could be brought closer (for example, to a 20 meter distance between drones) to capture better images or additional drone would be released; (b) the number of vehicles equipped with/without this system, where drones from multiple vehicles can collaborate to create an optimized drone swarm. This would help with optimal battery utilization as well; (c) route, traffic, and road condition, where, if there are hair pin turns in the route, if road condition is bad, if a huge truck is blocking vision, or the like; (d) the required co-ordination of speed between drones and the car, where a faster drone can help move the vehicle faster.

In some embodiments of the present disclosure, by using vehicle-to-vehicle (V2V) communication, with multiple vehicles on the route, the drones from each vehicle can collaborate and create a common navigation for all vehicles. Vehicles with this system can assist vehicles which do not have the system by sharing the enhanced view with it to be shown on their dashboard. The enhanced view could be altered to suit the angle at which the second vehicle's view is taken.

In some embodiments of the present disclosure, the system would handle hair-pin turns by showing an extended view of other side of the hair pin turn, so the driver can beforehand get an realistic view of how the route is after the hair-pin turn. Each of these features are described in greater detail below with reference to the Figures.

Figure 2:
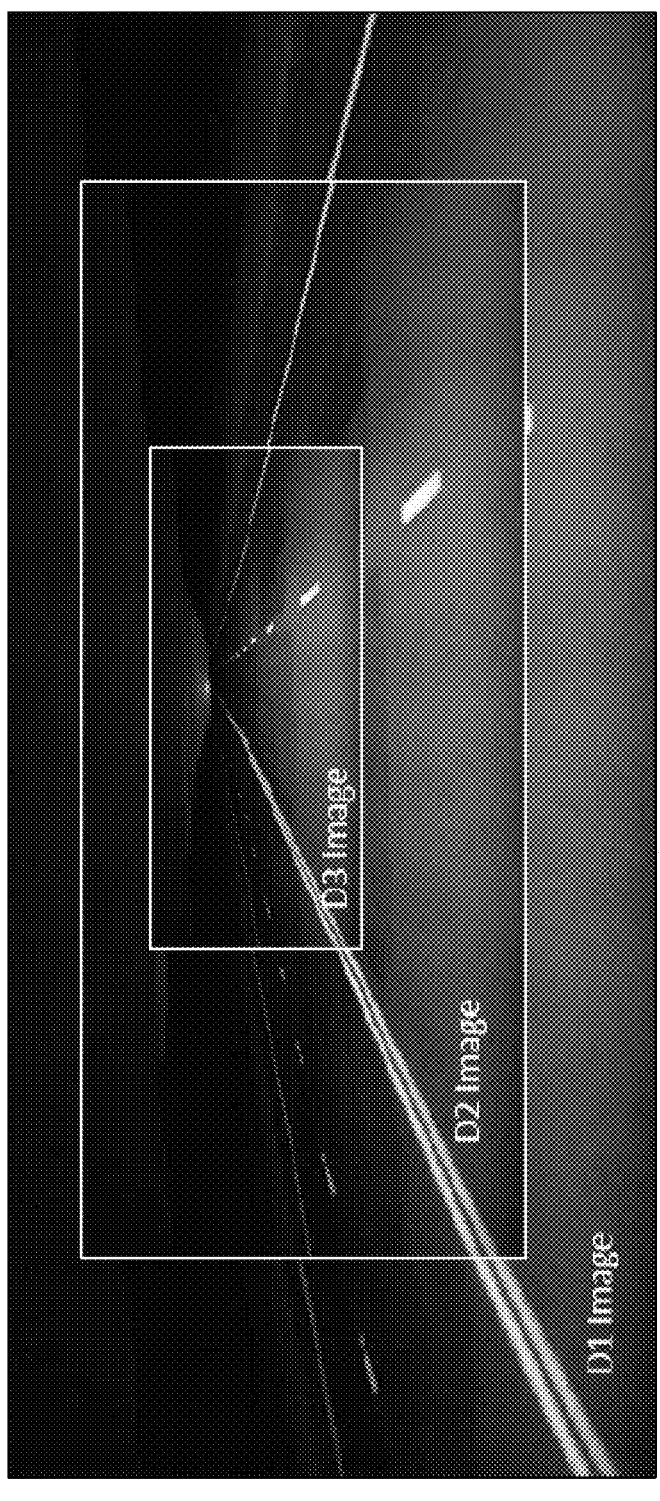
FIG. 2 shows a composite image formed from combining images of the network of collaborating drones, of FIG. 1, to provide a user with a navigation aid, consistent with an illustrative embodiment.
Figure 3:
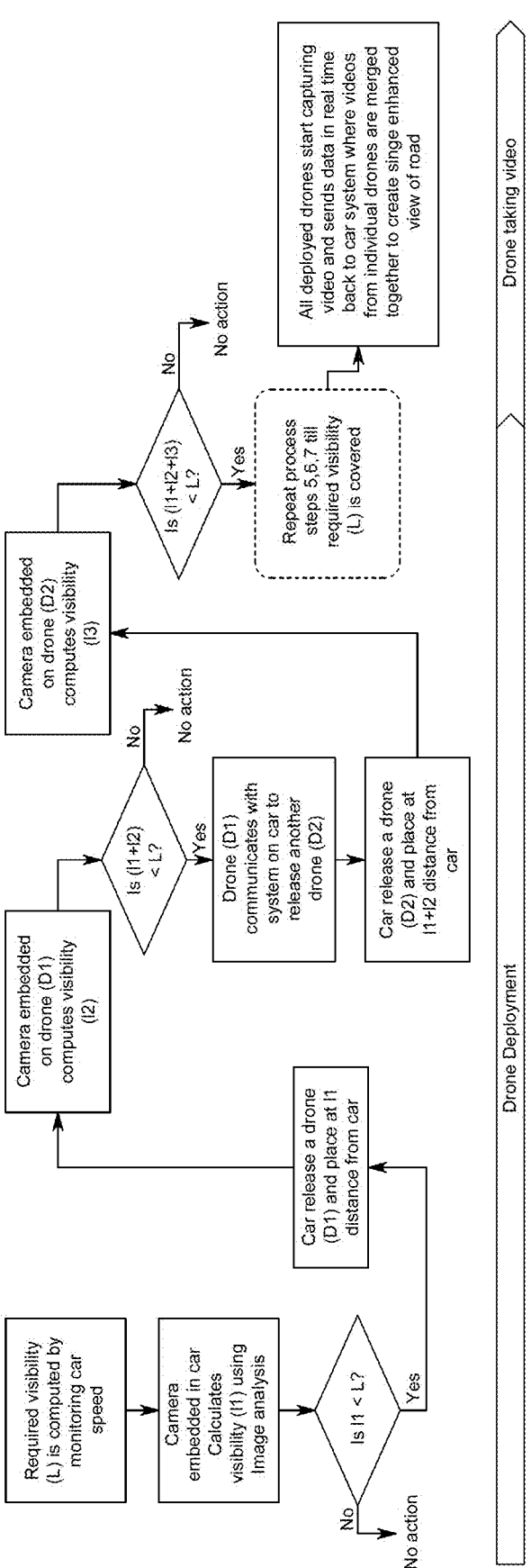
FIG. 3 shows a flow chart describing the operation of the network of collaborating drones of FIG. 1.

Referring to FIGS. 1 through 3, a method for route navigation using a network of collaborating drones is described. A vehicle 100 traveling on a road 112 will have an attached camera 102 and a computing device 104, such as an edge computing device, to analyze video images captured by the camera 102 to calculate the road visibility l1 from the vehicle 100. The vehicle 100 will also carry a collection of autonomous drones 106, each equipped with drone camera 108 and a drone computing device 110, such as a drone edge computing device.

While traveling on the road 112, if the visibility drops due to fog and is less than user's preferred visibility L as set by the user or as dynamically decided based on the vehicle speed, time of day, or the like, the vehicle 100 will release drones 106, one by one. The first drone 106A will fly up to a distance equal to the visibility distance l1 from the vehicle 100 and will continue flying at the same speed of the vehicle 100, following the predefined road map.

First drone video images 120 captured by the first drone 106A are sent to the computing device 104 on the vehicle 100, where the first drone video images 120 are dynamically merged with vehicle video images 122 captured by the camera 102 on the vehicle 100 in such a way so that the driver sees clear vision up to first drones' visibility l2. In some embodiments, each of the drones 106 may be at a height that is at or near a height of the vehicle camera. In other embodiments, each of the drones 106 may be at different heights, such as a greater height, than the vehicle camera, where the image merging may provide angular adjustment to provide a uniform merged video, as shown in the example of merged video images from multiple drones in FIG. 2. The merging can be done, for example, by altering the logic of conventional merging mechanisms. In some embodiments, the images captured could be enhanced to eliminate the foggy conditions using conventional technology.

If the resulting enhanced visibility (in this case, l1+l2) is equal to or more than user preferred visibility L, then no more drones will be released. Otherwise, a second drone 106B will be released, which will place itself at a distance of first drones visibility distance l2, will fly at same speed of the vehicle 100, and will send video images to the computing device 104 on the vehicle 100, where all three set of images (vehicle images 122, first drone images 120, and second drone images 124) are again merged dynamically to show enhanced vision up to second drones visibility distance l3.

This process of launching new drones and the dynamic merging of video images will continue until the preferred visibility L is achieved or number of drones in stock is exhausted. During travel in foggy weather, these drones will continuously monitor visibility and will adjust their relative positions to provide required visibility. If natural visibility reduces over travel, additional drones will be release and deployed. On the other hand, if natural visibility increases, additional drones will fly back to car.

In the case of autonomous cars (including fully autonomous cars or semi-autonomous cars), the images captured by the drones could be the source of data to extract information to take timely decisions. The autonomous cars would be able to extract information about the vehicles ahead and the road conditions and more from the images. For example, if there is a pothole at a distance, the drones would be able to measure and capture the depth of the pothole in the images and the autonomous vehicles can extract the information from the images. Also, the system can give the vehicles a longer FOV (also called angle of view) which will be more accurate, since the images are being captured closer to the location. Using multiple cameras, aspects of the present disclosure can visualize the road better, making it easier to merge with the images from the images captured from other drones.

The drone computing device 110 and the drone camera 108 not only evaluate visibility, but also identify and evaluate if any risks are ahead, such as any obstruction, landslide, animals, or the like. Once any risk is identified, the drone computing device 110 notifies the computing device 104 on the vehicle 100. Based on individual notifications received from the drones 106, a warning status can change and the driver will be well informed about any potential risk ahead, as described in greater detail below in conjunction with FIG. 8.

Figure 4:
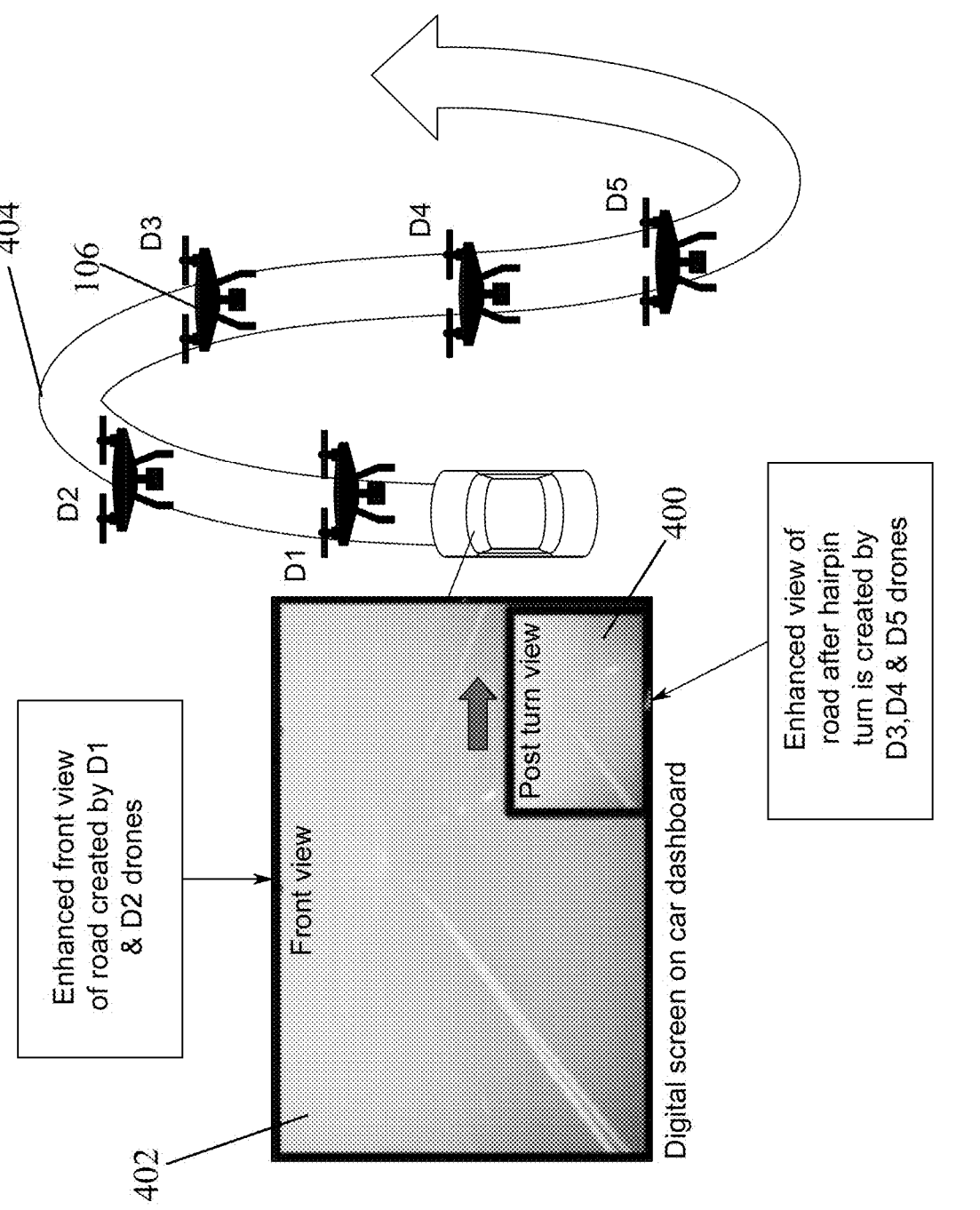
FIG. 4 shows a pictorial representation of how a network of collaborating drones are used to assist with navigation prior to a user approaching a turn in the road, consistent with an illustrative embodiment.

Referring to FIG. 4, if there are turns along a foggy road, drones 106 will identify the turn and move along a predefined path as set in a route map. In case of left/right turns or a hairpin turn 404, a view 400 of the road after the turn will be shown in separate screen or inside the main screen 402 with a clear indication of which screen is showing which part of road.

The drones 106 can be recharged via the vehicle battery (not shown) or the system can use backup drones. Like current electric cars, which have a limited capacity and would need recharging, the same case is present with the drones 106. With the improving battery technology for capacity and performance, the required charging technology would only improve over time. There are existing mechanism of battery management that can be used in the with the system according to the present disclosure, such as drone swapping, battery hot-swapping, wireless power transfer, and the like.

Figure 5:
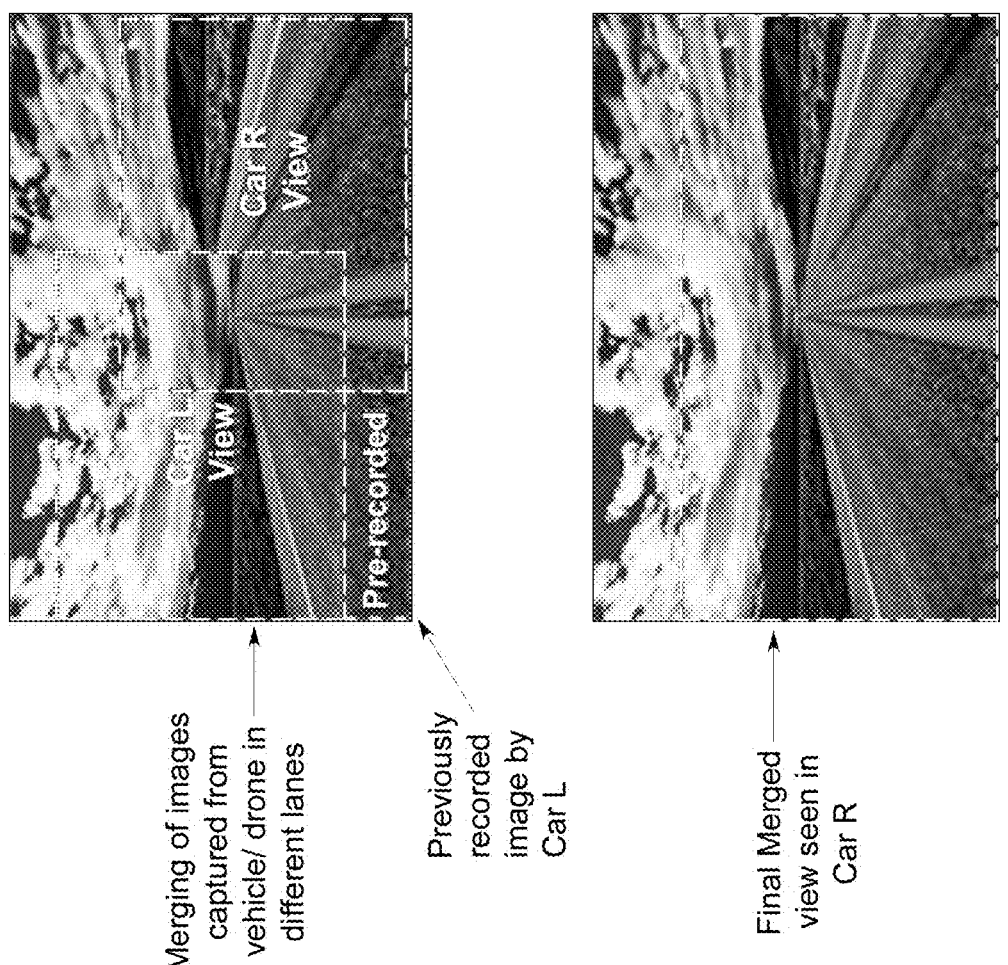
FIG. 5 shows how cars in different lanes may view an image from a network of collaborating drones from different angles, depending on their lane position, consistent with an illustrative embodiment.
Figure 5:
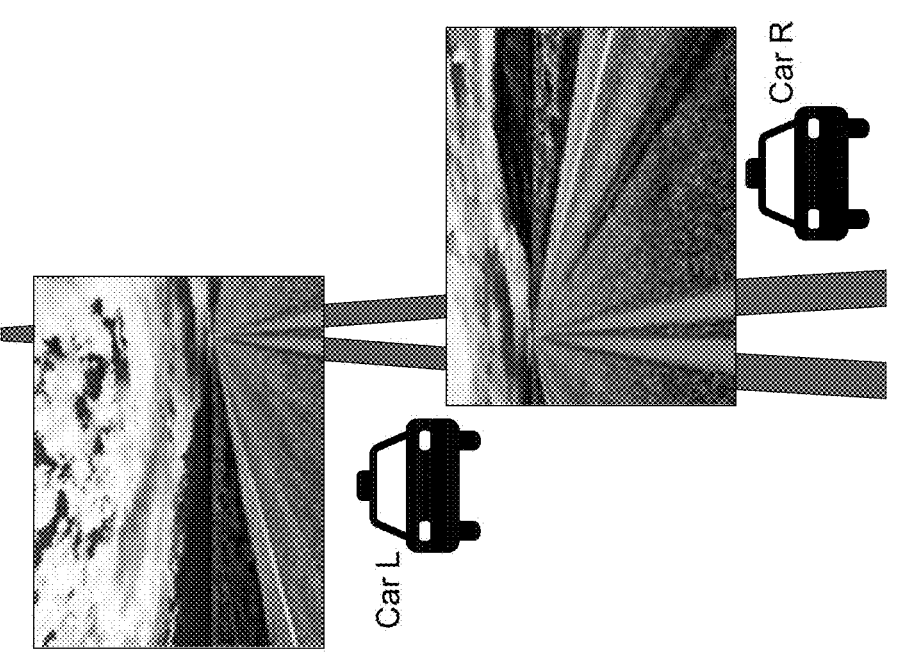

If there are cars on the road which do not have the system according to the present disclosure, then, by using vehicle-to-vehicle (V2V) communication, these cars could get the merged images (the enhanced road view) from the other car (having the system according to the present disclosure) and can display the same on their dashboard monitor. As shown in FIG. 5, the shared images with all the vehicles can be adapted to the angle of view of that specific car since the images captured are of better quality and resolution. In some embodiments, the angle of view can be adjusted for cars in different lanes of travel. In some embodiments, the drone enabled car could become the leader or navigator and direct itself to the front to guide the rest of the cars. In some embodiments, when the V2V system indicates that there is a vehicle ahead of a first vehicle that has drones already deployed, the first vehicle can use the video shared from the vehicle ahead and can either not deploy drones, or may deploy drones to permit drones from the vehicle ahead to return to the vehicle to recharge.

Figure 6:
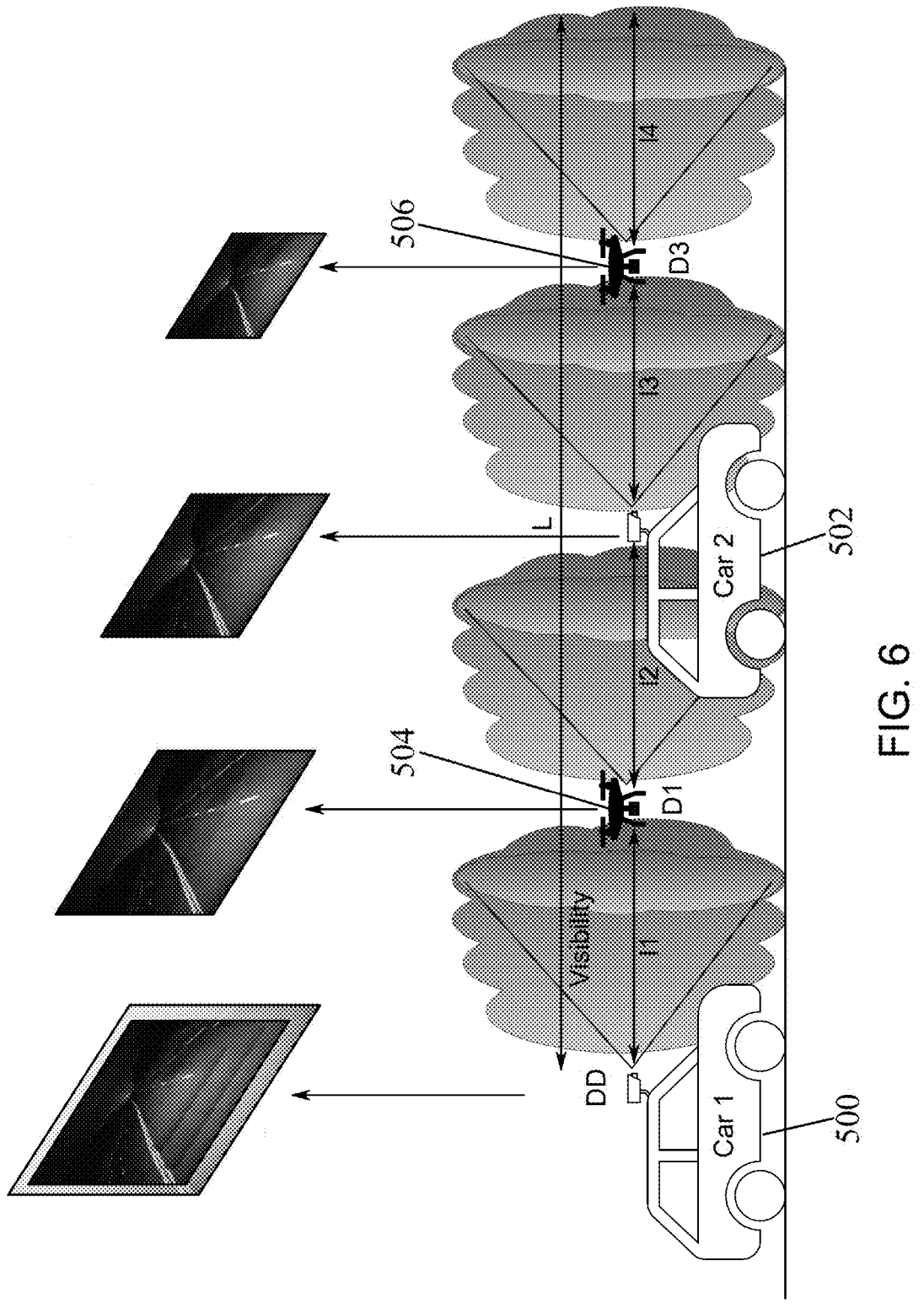
FIG. 6 shows a pictorial representation of how a network of collaborating drones from multiple vehicles can be uses, interactively, to assist with navigation, consistent with an illustrative embodiment.
Figure 7:
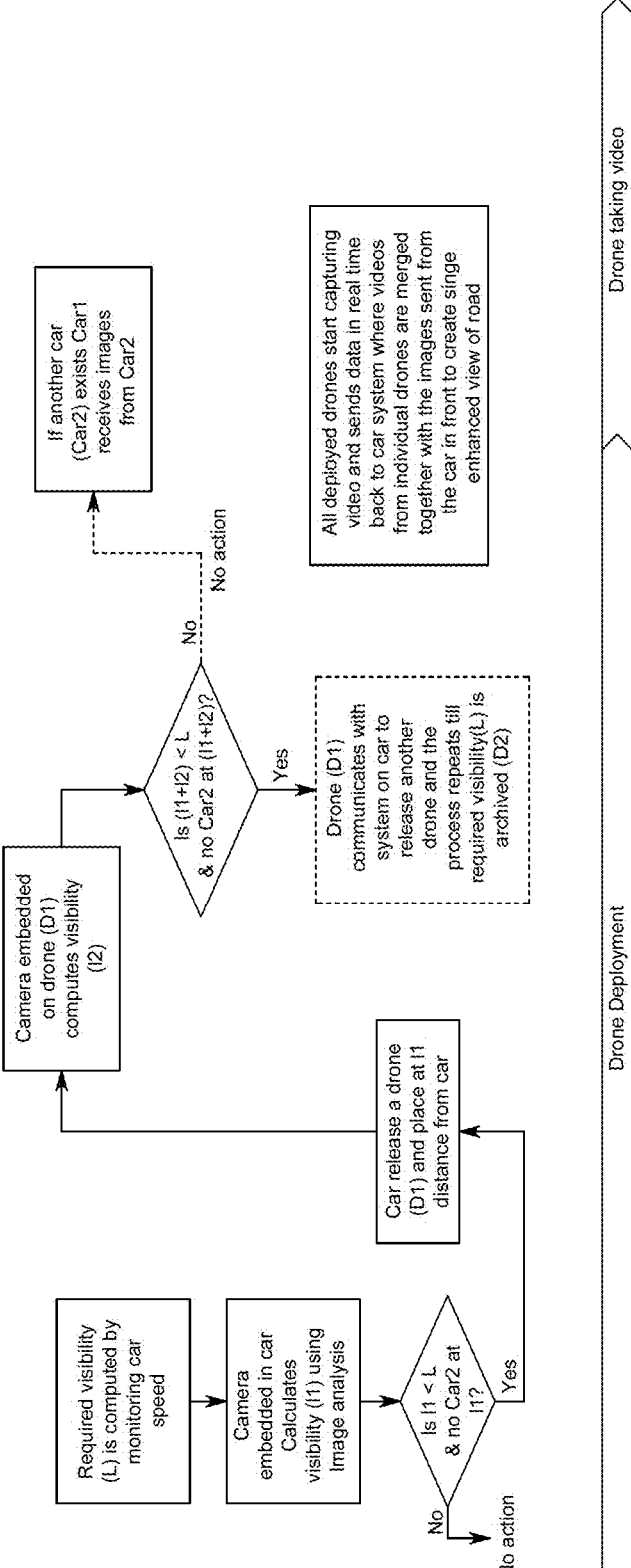
FIG. 7 shows flow chart describing the operation of the network of collaborating drones of FIG. 6.

Referring to FIGS. 6 and 7, if there are multiple cars with the drone technology according to embodiments of the present disclosure, the vehicles 500, 502 could operate in a very optimized manner. The vehicles 500, 502 and their respective drones 504, 506 would decide which ones or how many are needed based on battery power, visibility, driver comfort, number of vehicles on road, and the like. For example, drone 506 may be a drone from the vehicle 502, while drone 504 may be a drone from vehicle 500. A drone swarm can be created to work together. This would make the battery utilization more optimized as well, as fewer deployed drones would be needed, permitting unused drones, from the shared drones in the drone swarm, to be charged.

Figure 8:
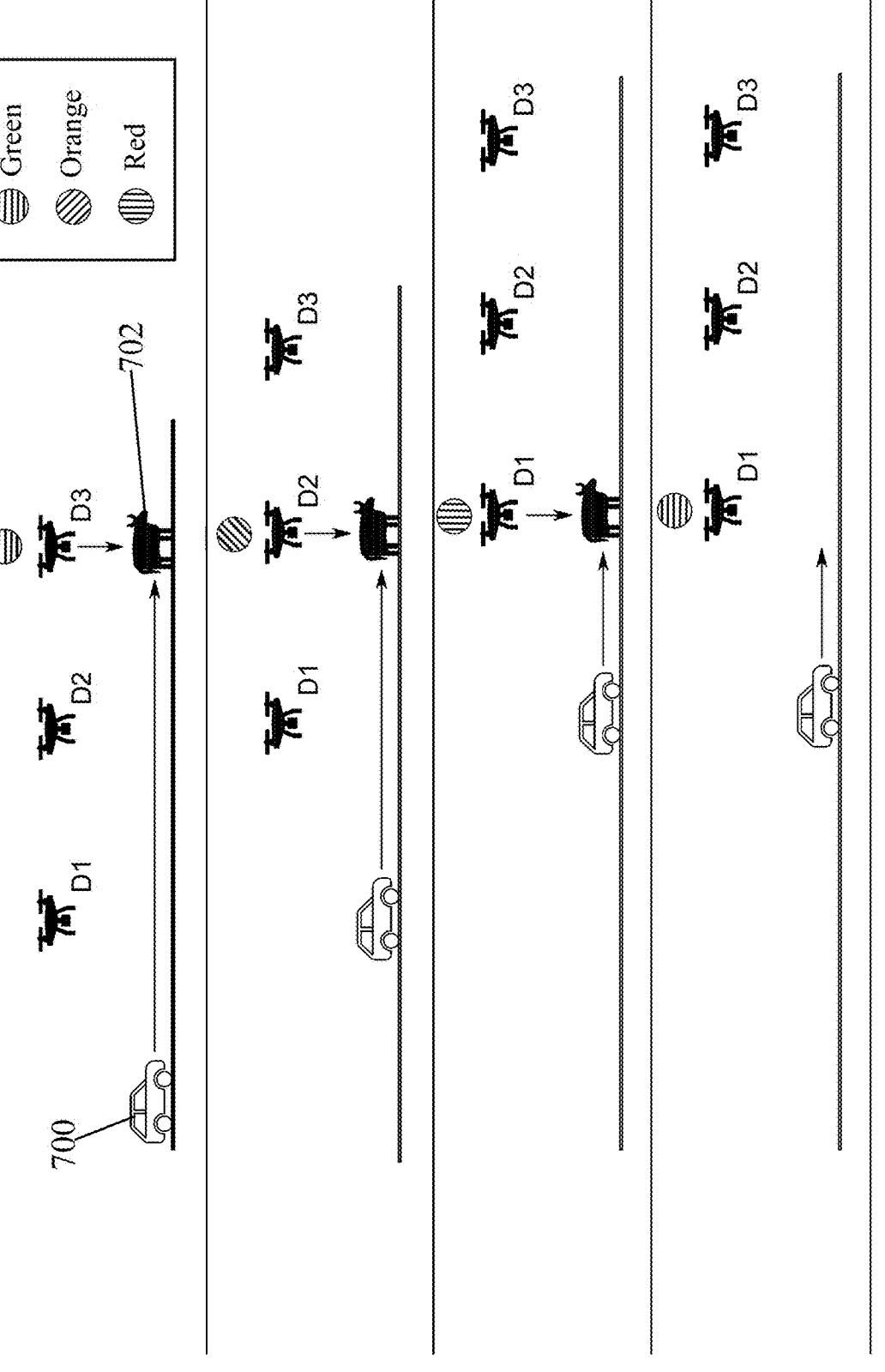
FIG. 8 shows how a network of collaborating drones can be used to provide an alert to a user, consistent with an illustrative embodiment.

Referring now to FIG. 8, an example of an alert mechanism usable with the systems and methods according to the present disclosure is described. As discussed above, a vehicle 700 is being assisted with the route navigation in foggy weather using three drones D1, D2, D3 for a total visibility distance of 100 meters.

As shown in the top line of FIG. 8, drone D3 detects there is an animal 702 in the middle of the road near the 100th meter from the vehicle 700. The drone D3 further detects that the animal is moving towards the side, so the drone D3 does not raise an alarm and shows a "green" signal since the speed of the animal moving and the speed of the vehicle 700 indicates that the animal would have crossed by the time the vehicle reaches the spot. As used herein, a "green" signal refers to a safe or no hazard situation. The signal may be a green indication, or may be some other form of indication to the driver.

The drone D3 communicates to the drone D2 about the obstruction on the road and wants the drone D2 to check on it when it reaches the same spot. Now, after a few seconds, as shown in the second line of FIG. 8, the drone D2 is at the same position as the drone D3 was earlier. The drone D2 detects the same animal is still there on the road and sees the animal has stopped moving now. The drone D2 does raise the warning signal and indicates, to the drone D1, that there is a possible emergency due to an obstruction and the drone D1 needs to check on the obstruction when it reaches the spot. The vehicle is also informed that there is a possible obstruction on the road ahead and the vehicle should slow down. The drone D2 would also calculate the possible speed the vehicle should slow down to, based on the obstruction and the distance of vehicle from it. Alternatively, the drone D2 could also inform the vehicle to be on one side of the road based on the obstruction to possibly avoid it.

As shown in the third line of FIG. 8, when the drone D1 reaches the same spot, it could take a final decision based on the position of the obstruction and could raise a "green" or a "red" signal for the vehicle to stop or proceed and could also give more specific instructions about speed, position on road, flashing the headlamps, or the like.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 9, computing environment 800 includes an example of an environment for the execution of at least some of the computer code involved in performing the inventive methods, including an edge computing device block 900, which can include an image generation block 902, configured for receiving images from the vehicle camera and from one or more drone cameras to form an enhanced image for the driver or the vehicle, and a drone deployment and control block 904, configured for determining a need to deploy drones based on visibility, charge state of the drones, and the like. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 9. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for assisting in navigating a vehicle, comprising:

using an image captured by a vehicle camera on the vehicle to determine a vehicle visibility distance for the vehicle with a computing device on the vehicle;

comparing the vehicle visibility distance to a predetermined desired visibility distance;

using a first drone at the vehicle visibility distance away from the vehicle when the vehicle visibility distance is less than the predetermined desired visibility distance; and combining the image captured by the vehicle camera with a first drone video image captured by the first drone to provide a combined image having a total visibility distance of a sum of the vehicle visibility distance and a first drone visibility distance.

2. The computer-implemented method of claim 1, further comprising:

using an additional drone at the total visibility distance when the total visibility distance is less than the predetermined desired visibility distance; and combining the image captured by the vehicle camera, the first drone video image, and an additional drone video image captured by the additional drone to provide a further combined image having a further total visibility distance of a sum of the vehicle visibility distance, the first drone visibility distance, and an additional drone visibility distance.

3. The computer-implemented method of claim 2, further comprising repeating each act of claim 2, stepwise with one additional drone at a time, until the further total visibility distance is greater than the predetermined desired visibility distance.

4. The computer-implemented method of claim 3, wherein a number of drones used is determined by a determined weather condition and a predetermined visibility distance for the vehicle under the determined weather conditions.

5. The computer-implemented method of claim 3, further comprising using one or more drones from a first vehicle and one or more drones from a second vehicle to create the combined image that is shared to both the first vehicle and the second vehicle, wherein an angle of view of the combined image is adjusted when the first vehicle and the second vehicle are in different lanes of travel.

6. The computer-implemented method of claim 5, wherein the vehicle shares the combined image with another vehicle that is not equipped with the one or more drones.

7. The computer-implemented method of claim 3, further comprising providing communication between each drone of the first drone and each additional drone, wherein the communication tracks a navigation obstacle and provides an alert to the vehicle.

8. The computer-implemented method of claim 7, further comprising:

generating a risk index of a possible mishap based on the first drone video image;

permitting alteration of the risk index as each additional drone identifies the possible mishap; and instructing the vehicle to perform at least one of a speed change, a position change, or a lighting change.

9. The computer-implemented method of claim 3, further comprising:

using an additional drone at a location past a curve in a road along a direction of travel of the vehicle; and displaying the combined image along with an additional image from the additional image, the additional image showing a vehicle travel path of the vehicle past the curve, beyond a visibility range of the vehicle camera.

10. The computer-implemented method of claim 3, further comprising:

providing communication between the vehicle and a second vehicle; and using at least one drone from each of the vehicle and the second vehicle to create a common navigation for both a first vehicle and a second vehicle.

11. A system comprising:

a processor;

a data bus coupled to the processor;

a memory coupled to the data bus; and a computer-usable medium embodying a computer program code, the computer program code comprising instructions executable by the processor and configured to:

use an image captured by a vehicle camera on the vehicle to determine a vehicle visibility distance for the vehicle with a computing device on the vehicle;

compare the vehicle visibility distance to a predetermined desired visibility distance;

use a first drone at the vehicle visibility distance away from the vehicle when the vehicle visibility distance is less than the predetermined desired visibility distance; and combine the image captured by the vehicle camera with a first drone video image captured by the first drone to provide a combined image having a total visibility distance of a sum of the vehicle visibility distance and a first drone visibility distance.

12. The system of claim 11, wherein the instructions are further configured to:

use an additional drone at the total visibility distance when the total visibility distance is less than the predetermined desired visibility distance; and combine the image captured by the vehicle camera, the first drone video image, and an additional drone video image captured by the additional drone to provide a further combined image having a further total visibility distance of a sum of the vehicle visibility distance, the first drone visibility distance, and an additional drone visibility distance.

13. The system of claim 12, wherein the instructions are further configured to repeat each act of claim 12, stepwise with one additional drone at a time, until the further total visibility distance is greater than the predetermined desired visibility distance.

14. The system of claim 13, wherein the instructions are further configured to use one or more drones from the vehicle and one or more drones from a second vehicle to create the combined image that is shared to both the vehicle and the second vehicle.

15. The system of claim 13, wherein the instructions are further configured to:

use an additional drone at a location past a curve in a road along a direction of travel of the vehicle; and display the combined image along with an additional image from the additional image, the additional image showing a vehicle travel path of the vehicle past the curve, beyond a visibility range of the vehicle camera.

16. A computer program product for providing a navigation assistance, the computer program product comprising a computer readable storage medium having program instructions embodied therewith, wherein an execution of the program instructions by a computer cause the computer to:

use an image captured by a vehicle camera on the vehicle to determine a vehicle visibility distance for the vehicle with a computing device on the vehicle;

compare the vehicle visibility distance to a predetermined desired visibility distance;

use a first drone at the vehicle visibility distance away from the vehicle when the vehicle visibility distance is less than the predetermined desired visibility distance; and combine the image captured by the vehicle camera with a first drone video image captured by the first drone to provide a combined image having a total visibility distance of a sum of the vehicle visibility distance and a first drone visibility distance.

17. The computer program product of claim 16, wherein the execution of the program instructions further cause the computer to:

use an additional drone at the total visibility distance when the total visibility distance is less than the predetermined desired visibility distance; and combine the image captured by the vehicle camera, the first drone video image, and an additional drone video image captured by the additional drone to provide a further combined image having a further total visibility distance of a sum of the vehicle visibility distance, the first drone visibility distance, and an additional drone visibility distance.

18. The computer program product of claim 17, wherein the execution of the program instructions further cause the computer to repeat each act of claim 17, stepwise with one additional drone at a time, until the further total visibility distance is greater than the predetermined desired visibility distance.

19. The computer program product of claim 18, wherein the execution of the program instructions further cause the computer to use one or more drones from a first vehicle and one or more drones from a second vehicle to create the combined image that is shared to both the first vehicle and the second vehicle.

20. The computer program product of claim 16, wherein the execution of the program instructions further cause the computer to:

use an additional drone at a location past a curve in a road along a direction of travel of the vehicle; and display the combined image along with an additional image from the additional image, the additional image showing a vehicle travel path of the vehicle past the curve, beyond a visibility range of the vehicle camera.

* * * * *